D. W. COLLINS.
METAL CUTTER OR SHEARS.
APPLICATION FILED FEB. 26, 1913.
1,096,684.
Patented May 12, 1914.
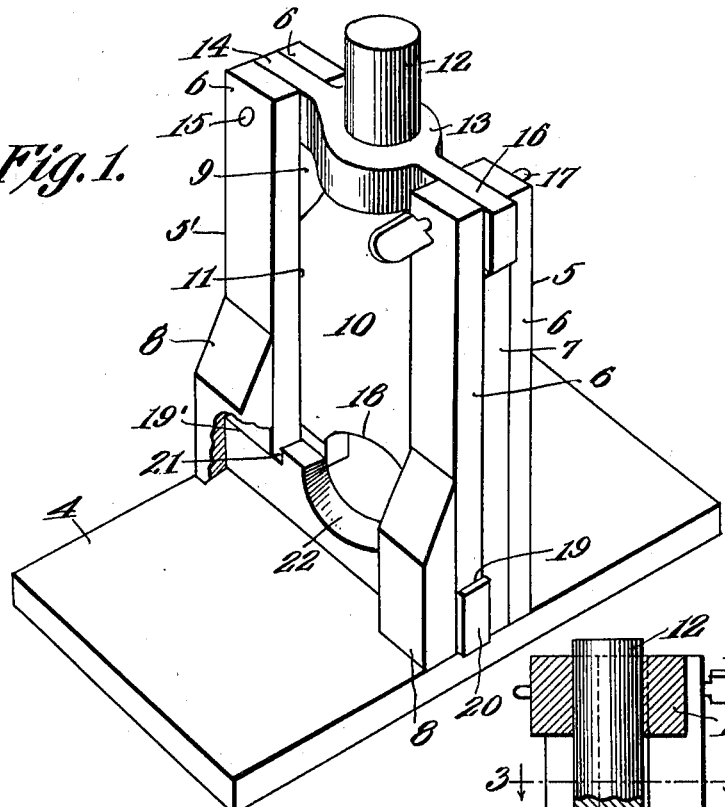
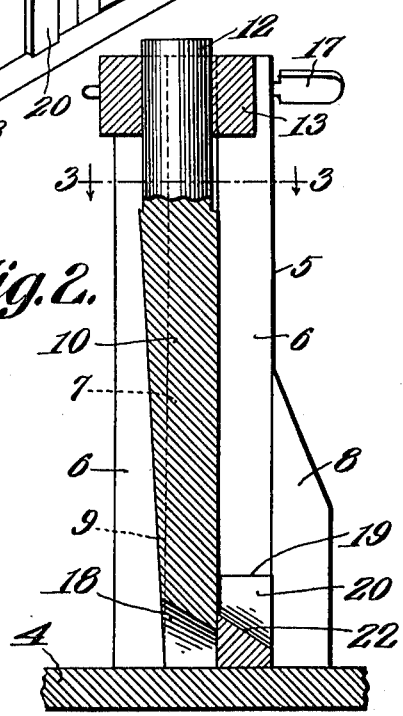
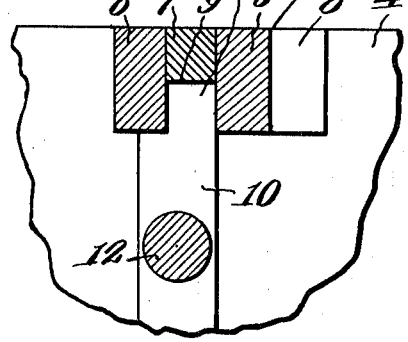
D. W. Collins,
Inventor
Witnesses
by
Attorneys

UNITED STATES PATENT OFFICE.

DAVE W. COLLINS, OF EARL, ARKANSAS.

METAL CUTTER OR SHEARS.

1,096,684.  Specification of Letters Patent.  Patented May 12, 1914.

Application filed February 26, 1913. Serial No. 750,923.

*To all whom it may concern:*

Be it known that I, DAVE W. COLLINS, a citizen of the United States, residing at Earl, in the county of Crittenden and State of Arkansas, have invented a new and useful Metal Cutter or Shears, of which the following is a specification.

The present invention appertains to metal cutters or shears and aims to provide a novel and improved device for cutting or severing wires, cables, rods, bars and the like.

It is the object of the present invention to provide a device of the character indicated which may be employed for readily and conveniently severing elongated metallic stock, the movable cutter being actuated conveniently by the blow of a sledge, hammer or other suitable implement.

Another object of the present invention is to provide a device of the character indicated, wherein the movable cutter may be removed so that the stock may be conveniently disposed under the cutter.

A further object of this invention is to provide a stationary cutter coöperating with the movable cutter, and which may be detached in a novel manner for the purpose of sharpening or replacement.

The present invention also aims to provide a device of the character indicated, which shall be simple, durable, substantial, compact and inexpensive in construction, as well as convenient, serviceable, and efficient in its use.

With the foregoing and other objects in view, which will appear as the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein similar reference characters have been employed to denote corresponding parts and wherein:—

Figure 1 is a perspective view of the device, a portion thereof being broken away. Fig. 2 is a central vertical section of the device, portions of the base being broken away. Fig. 3 is a sectional detail taken on the line 3—3 of Fig. 2.

Referring specifically to the drawing, the numeral 4 designates a base or bed plate, which may be of any preferred construction. On this base 4 there are secured a pair of upstanding guides 5 and 5', each of which is constituted of a pair of bars 6 having a shim strip 7 fitting or sandwiched between their outer edges so that the inner edges are free and provide a channel or slideway 9 for the movable cutter hereinafter described. A short piece or block 8 is also secured to one of the bars 6 adjoining the base. It is to be understood that the blocks or members 8 are in reality portions of the guides or standards 5 and 5'.

The movable cutter has been designated by the numeral 10, the same having the tongues 11 along its edges slidably engaging within the channels or slideways 9 of the guides, and having an upstanding stem 12 adapted to be struck by a sledge, hammer or the like. A guide is also provided for the stem 12, the same including an eye 13 loosely embracing the stem. The eye 13 is provided with the projection 14 pivoted between the upper ends of the bars 6 of the guides 5', it being noted that the bars 6 project above the respective shim strip 7 of each of the guides. The eye 13 is also provided with an oppositely extending projection 16 adapted to fit normally between the upper ends of the bars 6 of the guide 5, a pin 17 being passed through the respective bars 6 and the projection 16 to retain the eye 13 normally in position. It will be noted that the eye 13 retains the cutter 10 within the guides and prevents it from jumping out of the guides, the cutter 10, however, being removable for the reason that when the cutter is in its lowermost position, the pin 17 may be withdrawn so as to permit the eye 13 to be swung out of engagement with the stem so as to leave the cutter 10 free to be withdrawn. The lower end of the cutter 10 is cut away and beveled to provide a cutting or knife edge 18.

The lower end of the bar 6 of the guide 5 adjoining the block 8 terminates above the base to provide an opening 19 in the guide 5 and the respective bar 6 of the guide 5' also terminate above the base 4 to provide an opening 19' through the guide 5'. An elongated stationary cutter 20 is normally seated on the base 4 with its ends engaging in or through the respective openings 19 and 19'. The opening 19' is slightly smaller than the opening 19 and the cutter 20 is provided with a shoulder or stop 21 adapted to seat or contact with the guide 5' so as to limit the movement of the cutter in order that when the cutter is inserted, the same may be brought to the proper or operative position. The cutter 20 has the intermediate portion of its upper edge cut away and beveled to provide a cutting or knife edge 22 adapted to coöperate with the cutting or knife edge 18 of the movable cutter 10.

In operation, the cable, rod, bar, or other stock to be severed may be inserted lengthwise between the two cutters, or if the stock is to be severed at an intermediate point, the stock may be inserted laterally between the guides by withdrawing the removable cutter 10, after disengaging the eye 13 from the stem 12 as above described, thus, if the stock is to be cut at a point at considerable distances from the ends, it will be noted that the stock may be inserted at such point between the cutters without the necessity of pulling the stock through the cutters from one end. The stock may be severed by striking the stem 12 of the movable cutter with a sledge, hammer or other implement, and the implement in impinging on the stem 12 will cause the knife or shear edge 18 to approach the knife or shear edge 22 so as to sever or cut the stock in an efficient manner. The impact or blow of the hammer may be repeated until the stock is severed.

As above noted, the movable cutter 10 may be withdrawn for the introduction of the stock, or for the purpose of sharpening it or for the purpose of replacing it with a new cutter when necessary. The stationary cutter may be withdrawn for similar purposes, that is, for sharpening or replacement by sliding it outwardly or laterally through the opening 19 of the guide 5. The stationary cutter 20 or a new one, may readily be brought to position by inserting the proper end through the opening 19 and then forcing the cutter to position, as will be apparent.

What is claimed is:—

1. In a device of the character described, a base, a pair of upstanding guides carried thereby having openings therein adjoining the base, a movable cutter slidable between the guides, and a stationary cutter seated on the base and having its terminals engaging through the said openings, the stationary cutter being adapted to be withdrawn and inserted through one of the said openings.

2. In a device of the character described, a base, a pair of upstanding guides thereon having openings therein adjoining the base, a movable cutter slidable between the guides, and a stationary cutter having its terminals engaging through the said openings and seated on the base, the last mentioned cutter having a shoulder to seat against one guide and being adapted to be withdrawn and inserted through the other guide.

In testimony that I claim the foregoing as my own, I have hereto affixed my signature in the presence of two witnesses.

DAVE W. COLLINS.

Witnesses:
BEN R. NORVELL,
EDWIN MATTHEWS.